United States Patent [19]
Urakami

[11] 3,929,578
[45] Dec. 30, 1975

[54] PROCESS FOR CULTIVATING ETHANOL-ASSIMILATING YEASTS

[75] Inventor: Teizi Urakami, Niigata, Japan

[73] Assignee: Mitsubishi Gas Chemical Co., Ltd., Japan

[22] Filed: Oct. 29, 1974

[21] Appl. No.: 519,019

[30] Foreign Application Priority Data
Nov. 9, 1973 Japan.............................. 48-125976

[52] U.S. Cl. ..................... 195/49; 195/82; 195/115
[51] Int. Cl.² ........................................... C12B 1/00
[58] Field of Search........................ 195/49, 115, 82

[56] References Cited
UNITED STATES PATENTS
3,681,200   8/1972   Ridgway, Jr. .......................... 195/49

Primary Examiner—A. Louis Monacell
Assistant Examiner—R. B. Penland
Attorney, Agent, or Firm—Armstrong, Nikaido & Wegner

[57] ABSTRACT

Ethanol-assimilating yeasts of, for example, the genus Pichia, Mycoderma, Candida, Saccharomyces, Hansenula, Endomyces, Debaryomyces, Cryptococcus, Torulopsis Rhodotorula or Lipomyces are cultivated with a higher productivity in a higher yield without any contamination of bacteria by conducting cultivation at an ethanol concentration of not more than 0.8% by weight, a dissolved oxygen concentration of 0.1 to 30 ppm, a dissolved carbon dioxide concentration of 0.38 to 380 ppm, pH of 2.0 to 5.0 and temperature of 25° to 48°C. The resulting yeasts can be utilized as food or fodder directly or after treatments, or as a raw material for extraction of valuable substances, nucleic acids, vitamins, coenzymes, proteins, and lipids therefrom.

6 Claims, 1 Drawing Figure

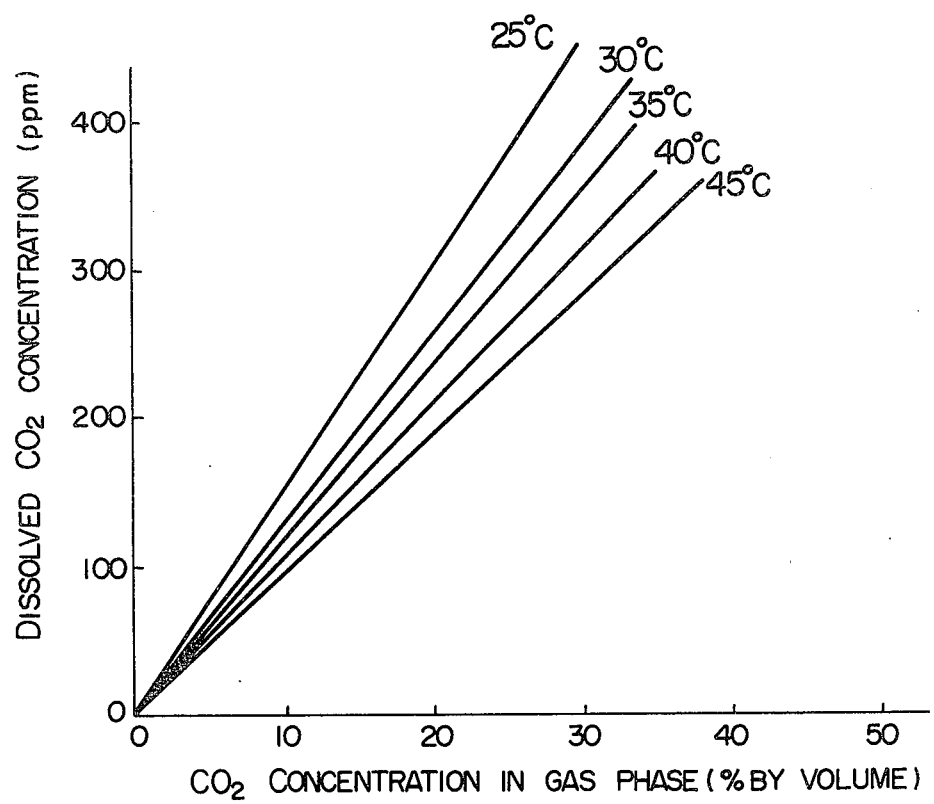
FIG.

PROCESS FOR CULTIVATING ETHANOL-ASSIMILATING YEASTS

This invention relates to a process for cultivating ethanol-assimilating yeasts, and more particularly to a process for cultivating ethanol-assimilating yeasts, using ethanol as a main carbon source, which comprises cultivating the yeasts in a culture medium at an enthanol concentration of not more than 0.8% by weight, a dissolved oxygen concentration of 0.1 to 30 ppm, a dissolved carbon dioxide concentration of 0.38 to 380 ppm, pH of 2.0 to 5.0 and temperature of 25° to 48°C.

Heretofore, it is well known that various microorganisms can assimilate ethanol, but studies on fermentation directed to obtaining the microbial cells themselves, using ethanol as a main carbon source, have not been so much made.

Heretofore, it is known that an ethanol concentration of a medium for obtaining yeast cells by cultivating yeasts, using ethanol as a carbon source, is preferably 2% by weight or more, and more preferably 3 to 5% by weight. However, when a medium contains such a large amount of ethanol, ethanol is not only evaporated during the cultivation, but when a culture broth, which has been freed from yeast cells but still contains ethanol, is discharged to the outside, for example, to the river, BOD of the river will be also unpreferably increased. Thus, it is necessary to recover or remove ethanol from the broth which has been freed from yeast cells. Therefore, it is necessary to make the ethanol concentration of culture medium as low as possible, for example, to such a degree as not to influence propagation of the yeasts. It is also possible to increase a cell yield on the basis of the added ethanol by making the ethanol concentration of culture medium low in that manner.

As a result of strenuous studies on a process for obtaining a larger amount of yeast cells in a medium at a low ethanol concentration, the present inventors have established the present invention.

As yeasts capable of producing a large amount of cells by assimilating ethanol, there are known yeasts belonging to the genera Pichia, Mycoderma, Candida, Saccharomyces, Hansenula, Endomyces, Debaryomyces, Cryptococcus, Torulopsis, Rhodotorula, Lipomyces, etc., but particularly preferably strains for the present invention are *Candida alcomigas* Ya-23 (FERM P-1973; NRRL Y-8023), *Torulopsis methanothermo* U-22 (FERM P-2336; ATCC No. 20434), *Torulopsis enokii* Y-113 (FERM P-2064; ATCC No. 20432), *Torulopsis methanophiles* T-106 (FERM P-1928; ATCC No. 20433), *Saccharomyces cerevisiae ellipsoideus* (IAM 4140), *Saccharomyces cerevisiae* (bread yeast) (OUT 7871) *Hansenula alcolica* UM-88 (FERM P-2065; NRRL Y-8025), *Saccharomyces steineri* (OUT 7911), *Saccharomyces Uvarum* (OUT 7828), *Saccharomyces carlsbergensis* (OUT 7929), *Pichia farinosa miso mogi* (IAM 4526), *Candida utilis* (OUT 6020), and *Lipomyces sparkey* (OUT 6269).

The foregoing abbreviations for access numbers, "FERM", "NRRL", "ATCC", "IAM" and "OUT" stand for "Fermentation Research Institute, Agency of Industrial Science and Technology, Ministry of International Trade and Industry, Japan", "Northern Utilization Research and Development Division, U.S. Department of Agriculture, USA", "American Type Culture Collection, USA", "Institute of Applied Microbiology, University of Tokyo, Japan", and "Osaka University, Faculty of Engineering, Japan", respectively.

Microbiological properties of *Candida alcomigas* Ya-23 (FERM P-1973; NRRL Y-8023), *Torulopsis methanothermo* U-22 (FERM P-2336; ATCC No. 20434), *Torulopsis enokii* Y-113 (FERM P-2064; ATCC No. 20432), *Torulopsis methanophiles* T-106 (FERM P-1928; ATCC No. 20433) and *Hansenula alcolica* UM-88 (FERM P-2065; NRRL Y-8025) are given below:

*Candida alcomigas* Ya-23 (FERM P-1973; NRRL Y-8023)

a. Growth states in various media:
1. MY liquid medium: cultivated at 28°C for 2 – 7 days; cell sizes: (1.0 – 3.0) × (4.0 – 8.0) microns; oval, short ellipsoidal or long ellipsoidal; singly or in pairs, pellicule formed; reproduced by multilateral budding.
2. MY agar medium: cultivated at 28°C for 4 days; pale yellowish, raised colonies with rough surfaces and entire or undulate margins.
3. Slide culture on corn extract agar medium: cultivated at 28°C; Pseudomycellium is formed.
4. Methanol-containing medium: cultivated at 28°C, pale yellowish, raised colonies with rough surfaces and entire or undulate margins.

b. Formation of ascospores: not formed on improved, Gorodokowa agar medium, gypsum block medium, malt agar medium, and sodium acetate agar medium.

c. Formation of ballistospores: not formed in MY agar plate culture.

d. Physiological properties:
1. Optimum growth conditions: good growth at 20° – 35°C; good growth at pH 2.0 – 7.0
2. Growth range: growable at 5° – 37°C; poor growth at pH of more than 7.50; perished by heating at 60°C for 10 minutes.
3. Assimilation of nitrates: positive
4. Splitting of arbutin: negative
5. Liquefaction of gelatin: negative
6. Formation of carotinoid pigment: negative
7. Formation of starch-like compounds: negative
8. Vitamin requirements: biotin is absolutely required; thiamine is stimulatively required.
9. Coagulation of milk: negative
10. Osmo-tolerance: salt-tolerance; growth observed in an aqueous solution containing less than 8% by weight of sodium chloride.
11. Methanol assimilation: good growth with utilization of methanol as carbon source even in the absence of other carbon sources.
12. Ethanol assimilation: good growth with utilization of ethanol as carbon source even in the absence of other carbon sources.
13. Urease test: negative
14. Splitting of fat: negative
15. Production of excess acid: negative
16. Formation of ester: positive e. Fermentation of various saccharides:

| D—glucose | ++ | trehalose | — |
|---|---|---|---|
| D—galactose | — | lactose | — |
| sucrose | — | inulin | — |
| maltose | — | raffinose | — |
| cellobiose | — | melibiose | — | f. Assimilation of various carbon sources

| | |
|---|---|
| D—arabinose | − |
| L—arabinose | − |
| L—ribose | ++ |
| D—xylose | ++ |
| D—mannose | ++ |
| D—galactose | − |
| D—rhamnose | − |
| D—glucose | ++ |
| maltose | − |
| sucrose | − |
| lactose | − |
| melibiose | ± |
| cellobiose | ± |
| trehalose | ± |
| raffinose | − |
| melezitose | − |
| α—methyl—D—glucoside | ± |
| soluble starch | ± |
| inulin | − |
| ethanol | ++ |
| erythritol | ++ |
| inositol | − |
| D—mannitol | ++ |
| glycerin | ++ |
| DL—lactic acid | ++ |
| salicin | ± |
| succinic acid | ++ |
| citric acid | − |
| acetic acid | − |

Isolation source: soils

*Torulopsis methanotheamo* U-22 (FERM P-2336, ATCC No. 20434)

a. Growth states in various media:
1. MY liquid medium: cultivated at 37°C for 2 – 7 days; vegetative cell sizes: (2 – 5) × (2 – 5) microns; circular, oval or short ellipsoidal; singly or in pairs; no formation of pellicule; no formation of arthrospores; reproduced by multilateral budding.
2. MY agar medium: cultivated at 37°C for 4 days; good growth; entire, pulvinate smooth, glistening, butyrous, white colonies.
3. Methanol-containing medium: cultivated at 37°C for 7 days; good growth; entire, convex, smoth, glistening, butyrous, yellowish white colonies.
4. Giant colonies on MY agar medium: cultivated at 20°C for 20 days; good growth, entire, raised, smooth, cretaceous, butyrous, white colonies.
5. Slide culture on corn extract agar medium: cultivated at 28°C for 4 weeks; no formation of true mycelium nor pseudomycellium b. Formation of ascospores: not formed on Gorodokowa agar medium, sodium acetate agar medium and malt agar medium.

c. Formation of ballistospores: not formed in MY agar plate culture.

d. Physiological properties:
1. Optimum growth conditions: good growth at 20° – 48°C; good growth at pH 2 – 7.5.
2. Growth range: poor growth at higher than 48°C, poor growth at pH of more than 7.5.
3. Assimilation of nitrates: positive
4. Splitting of arbutin: positive
5. Liquefaction of gelatin: negative
6. Formation of carotinoid pigment: negative
7. Formation of starch like compounds: negative
8. Vitamin requirement: biotin is absolutely required; thiamine is stimulatively required.
9. Coagulation of milk: negative
10. Osmo-tolerance: growth observed in an aqueous solution of containing less than 8% by weight of sodium chloride.
11. Methanol assimilation: good growth with utilization of methanol as carbon source in the absence of other carbon sources.
12. Urease test: negative
13. Splitting of fat: negative
14. Production of excess acid: negative
15. Formation of ester: negative e. Fermentation of various saccharides:

| | | | |
|---|---|---|---|
| D—glucose | + | lactose | − |
| D—galactose | − | inulin | − |
| sucrose | − | raffinose | − |
| maltose | − | melibiose | − |
| cellobiose | − | α-methyl—D—gluoside | − |
| trehalose | + (weak) | soluble starch | − | f. Assimilation of various carbon sources:

| | |
|---|---|
| D—arabinose | ± |
| L—arabinose | ± |
| D—ribose | ++ |
| D-xylose | ++ |
| D—glucose | ++ |
| D—mannose | ++ |
| D—galactose | ± |
| L—rhamnose | + |
| maltose | ++ |
| sucrose | ++ |
| lactose | − |
| melibiose | − |
| cellobiose | ++ |
| trehalose | ++ |
| raffinose | ± |
| melazitose | ++ |
| α—methyl—D—glucoside | + |
| soluble starch | ± |
| inulin | ± |
| ethanol | ++ |
| erythritol | ++ |
| inositol | − |
| D—mannitol | ++ |
| glycerin | ++ |
| DL—lactic acid | ± |
| salicin | ++ |
| succinic acid | + |
| citric acid | + |
| arbutin | ++ |
| D—glycitol | ++ |

Isolation source: soils

*Torulopsis enokii* Y-113 (FERM P-2064; ATCC 20432)

a. Growth states in various media:
1. MY liquid medium: cultivated at 28°C for 2 – 7 days, cell sizes: (1.0 – 8.0) × (1.0 – 8.0) microns; circular, oval, short ellipsoidal or long ellipsoidal; singly or in pairs; pellicule formed; reproduced by multilateral budding.
2. MY agar medium: cultivated at 28°C for 4 days; white, raised, smooth colonies with undulate or lobate margins.
3. Slide culture on corn extract agar medium: cultivated at 28°C; no formation of true mycelium nor pseudomycelium
4. Methanol-containing medium: cultivated at 28°C; pale yellowish, raised, smooth colonies with undulate or lobate margins.

b. Formation of ascospores: not formed on Gorodokowa agar medium, gypsum block medium, sodium acetate agar medium, and malt extract agar medium.

c. Formation of ballistospores: not formed in MY agar plate culture.

d. Physiological properties:

1. Optimum growth conditions: good growth at 20° – 35°C, good growth at pH 2.0 – 7.0.
2. Growth range: poor growth at 37°C; poor growth at pH of more than 7.50; perished by heating at 60°C for 30 minutes.
3. Assimilation of nitrates: positive
4. Splitting of arbutin: positive
5. Liquefaction of gelatin: negative
6. Formation of carotinoid pigment: negative
7. Formation of starch-like compounds: negative
8. Vitamin requirement: biotin is absolutely required; thiamine is stimulatively required.
9. Coagulation of milk: negative
10. Osmo-tolerance: salt-tolerance; growth observed in an aqueous solution containing less than 6% by weight of sodium chloride.
11. Methanol assimilation: good growth with utilization of methanol as carbon source even in the absence of other carbon sources.
12. Ethanol assimilation: good growth with utilization of ethanol as carbon source even in the absence of other carbon sources.
13. Urease test: positive
14. Splitting of fat: negative
15. Production of excess acid: negative
16. Formation of ester: positive e. Fermentation of various saccharides:

| glucose | ++ | trehalose | ±(very weak) |
|---|---|---|---|
| galactose | – | lactose | – |
| sucrose | ++ | inulin | – |
| maltose | – | raffinose | – |
| cellobiose | – | melibiose | – | f. Assimilation of various saccharides:

| D—arabinose | + |
|---|---|
| L—arabinose | ++ |
| D—ribose | ++ |
| D—xylose | ++ |
| D—glucose | ++ |
| D—mannose | ++ |
| D—galactose | ++ |
| L—rhamnose | + |
| maltose | ++ |
| sucrose | ++ |
| lactose | – |
| melibiose | ++ |
| cellobiose | ++ |
| trehalose | ++ |
| raffinose | ++ |
| melezitose | ++ |
| α—methyl—D—glucoside | + |
| soluble starch | ± |
| inulin | ++ |
| ethanol | ++ |
| erythritol | ++ |
| inositol | – |
| D—mannitol | ++ |
| glycerine | ++ |
| DL—lactic acid | ++ |
| salicin | ++ |
| succinic acid | ++ |
| citric acid | ++ |
| arbutin | + |

Isolation source: soils

*Torulopsis methanophiles* nov. sp. T-106 (FERM P-1928; ATCC No. 20433)

a. Growth states in various media:
1. MY liquid medium: cultivated at 28°C for 2 – 7 days; vegetative cell sizes: (2 – 4) × (2 – 5) microns; circular, oval or short ellipsoidal; singly or in pair, no formation of pellicule, no formation of arthrospore, reproduced by multilateral budding.
2. MY agar medium: cultivated at 28°C for 4 days; mucoid, convex, raised, smooth colonies with entire, round margins.
3. Slide culture on corn extract agar medium: cultivated at 28°C; no formation of the mycelium nor pseudomycellium
4. Methanol-containing medium: cultivated at 28°C; pale yellowish, convex, raised, smooth colonies with entire and round margins.

b. Formation of ascospores: not formed on Gorodokowa agar medium, gypsum block medium, sodium acetate agar medium, and malt extract agar medium.

c. Formation of ballistospores: not formed in MY agar plate culture.

d. Physiological properties:
1. Optimum growth conditions: good growth and propagation at 35° – 42°C, but good growth and propagation even at 20° – 35°C; good growth at pH 2 – 7.5.
2. Growth range: poor propagation at higher than 45°C; poor propagation at pH of more than 7.5.
3. Assimilation of nitrates: positive
4. Splitting of arbutin: positive
5. Liquefaction of gelatin: negative
6. Formation of carotinoid pigment: negative
7. Formation of starch-like compounds: negative
8. Vitamin requirement: biotin and thiamine are absolutely required, respectively.
9. Coagulation of milk: negative
10. Osmo-tolerance: salt-tolerance; growth observed in an aqueous solution containing less than 8% by weight of sodium chloride.
11. Methanol assimilation: good growth with utilization of methanol as carbon source even in the absence of other carbon sources.
12. Ethanol assimilation: good growth with utilization of ethanol as carbon source even in the absence of other carbon sources.
13. Urease test: negative
14. Splitting of fat: negative
15. Production of excess acid: negative
16. Formation of ester: negative e. Fermentation of various saccharides:

| D—glucose | ++ | trehalose | +(weak) |
|---|---|---|---|
| D—galactose | – | lactose | – |
| sucrose | – | inulin | – |
| maltose | – | raffinose | – |
| cellobiose | – | melibiose | – | f. Assimilation of various carbon sources:

| D—arabinose | + |
|---|---|
| L—arabinose | + |
| D—ribose | ++ |
| D—xylose | ++ |
| D—glucose | ++ |
| D—mannose | ++ |
| D—galactose | – |
| L—rhamnose | ++ |
| maltose | ++ |
| sucrose | – |
| lactose | – |
| melibiose | – |
| cellobiose | ++ |
| trehalose | ++ |
| raffinose | – |
| melezitose | ++ |
| α—methyl—D—glucoside | – |
| soluble starch | ++ |
| inulin | – |
| ethanol | ++ |
| erythritol | ++ |

-continued

| | |
|---|---|
| inositol | − |
| D—mannitol | ++ |
| glycerin | ++ |
| DL—lactic acid | ± |
| salicin | ++ |
| succinic acid | + |
| citric acid | − |
| arbutin | ++ |
| n—propanol | − |
| formaldehyde | − |

Isolation source: soils

*Hansenula alcolica* UM-88 (FERM P-2065: NRRL Y-8025)

a. Growth states in various media:
1. MY liquid medium: cultivated at 28°C for 2 – 7 days; cell sizes: (1.0 – 4.0) × (4.0 – 8.0) microns; oval, short ellipsoidal or long ellipsoidal; singly or in pairs; pellicle formed; reproduced by multilateral budding.
2. MY agar medium: cultivated at 28°C for 4 days; pale yellowish, raised, smooth colonies with undulate or lobate margins.
3. Slide culture on corn extract agar medium: cultivated at 28°C; no formation of true mycelium nor pseudomycelium.
4. Methanol-containing medium: cultivated at 28°C; pale yellowish, raised, smooth colonies with undulate or lobate margins.

b. Formation of ascospores: formed on sodium acetate agar medium, and malt extract agar medium; 1 – 4 hat-shaped spores formed.

c. Formation of ballistospores: not formed in MY agar plate culture.

d. Physiological properties:
1. Optimum growth conditions: good growth at 20° – 35°C; good growth at pH 2.0 – 7.0.
2. Growth range: poor growth at 35°C; poor growth at pH of more than 7.50.
3. Assimilation of nitrates: positive
4. Splitting of arbutin: negative
5. Liquefaction of gelatin: negative
6. Formation of carotinoid pigment: negative
7. Formation of starch-like compounds: negative
8. Vitamin requirement: biotin is absolutely required; thiamine is stimulatively required.
9. Coagulation of milk: negative
10. Osmo-tolerance: salt-tolerance: growth observed in an aqueous solution containing less than 6% sodium chloride.
11. Methanol assimilation: good growth with utilization of methanol as carbon source even in the absence of other carbon sources.
12. Ethanol assimilation: good growth with utilization of ethanol as carbon source even in the absence of other carbon sources.
13. Urease test: negative
14. Splitting of fat: negative
15. Production of excess acid: negative
16. Formation of ester: positive e. Fermentation of saccharides:

| | | | |
|---|---|---|---|
| glucose | ++ | raffinose | − |
| galactose | − | lactose | − |
| sucrose | − | maltose | − | f. Assimilation of various carbon sources:

| | |
|---|---|
| D—arabinose | − |
| l—arabinose | − |
| D—ribose | ++ |
| D—xylose | ++ |
| D—glucose | ++ |
| D—mannose | ++ |
| D—galactose | − |
| L—rhamnose | − |
| maltose | − |
| sucrose | − |
| lactose | − |
| melibiose | ± |
| cellobiose | ± |
| trehalose | − |
| raffinose | − |
| melezitose | − |
| α—methyl—D—glucoside | ± |
| soluble starch | ± |
| inulin | ± |
| ethanol | ++ |
| erythritol | ++ |
| inositol | − |
| D—mannitol | ++ |
| glycerin | ++ |
| DL—lactic acid | ++ |
| salicin | ± |
| succinic acid | ++ |
| citric acid | − |
| arbutin | − |

Isolation source: soils

When said microorganisms are cultivated according to the present invention, using ethanol as a main carbon source at an ethanol concentration in culture liquor of not more than 0.8% by weight, the growth induction period will be 3 – 5 hours, or less in batch-wise cultivation, whereas if the ethanol concentration is over 0.8% by weight, the growth induction period will be prolonged. For example, it will be 10 to 20 hours at an ethanol concentration of 3% by weight.

A higher ethanol concentration in culture liquor will unpreferably bring about said difficult problem. Especially in the continuous cultivation, such an average residence time as to allow the ethanol concentration of culture liquor to be more than 0.1% by weight will make the cultivation of yeasts unstable, and thus the ethanol concentration of not more than 0.1% by weight is preferable.

It is possible to keep said preferable ethanol concentration by setting the average residence time at any desired one in the continuous cultivation or starting the cultivation at any desired concentration, and continuously adding the corresponding amount of ethanol to that reduced by the propagation of the microorganisms in the batch-wise cultivation.

When yeast cells are cultivated aerobically, oxygen is usually necessary. When a dissolved oxygen concentration of culture medium is less than 0.1 ppm or more than 30 ppm in the present invention, a propagating ability of yeasts will be lowered, and thus not only the productivity, but also cell yield on the basis of consumed ethanol is lowered. The preferable dissolved oxygen concentration can be maintained by adjusting a rate of air supply to a cultivation vessel or a number of stirring in unit time in the case of stirring cultivation.

Generally, air containing 0.03% by volume of carbon dioxide is used as an oxygen supply source, but a large amount of carbon dioxide is generated by cultivation, and consequently the partial pressure of carbon dioxide is increased in the gas phase in the cultivation vessel. That is, the carbon dioxide concentration of culture liquor is increased correspondingly. The carbon dioxide concentration of culture liquor however depends upon the rate of air supply, oxygen concentration in gas phase, cultivating temperature, cultivating pressure, etc. even if the carbon dioxide is generated at a constant rate. Since the yeast cells hardly consume carbon dioxide, the carbon dioxide concentration of culture liquor can be calculated from carbon dioxide partial pressure in gas phase in a cultivation vessel, cultivating temperature and cultivating pressure. Thus, the present inventor calculated the carbon dioxide concentration of culture liquor from carbon dioxide concentration in gas phase in a cultivation vessel, cultivating temperature and cultivating pressure.

The growth induction period is increased and productivity and yield are lowered, for example, by making the carbon dioxide concentration less than 0.03% by volume or more than 30% by volume in gas phase in a cultivation vessel (correspondingly, the dissolved carbon dioxide concentration of culture liquor less than 0.38 ppm or more than 380 ppm). Yeast cells can be obtained with a higher productivity in a higher yield by adjusting the dissolved carbon dioxide concentration of culture liquor to 0.38 ppm to 380 ppm.

Relations between the carbon dioxide concentration in gas phase in a cultivation vessel and the carbon dioxide concentration of culture liquor at cultivating temperatures of 25°, 30°, 35°, 40° and 45°C under the atmospheric pressure are given in Table 1 and also shown in the accompanying drawing.

Single FIGURE is a diagram showing relations between the $CO_2$ concentration in gas phase in % and the dissolved $CO_2$ concentration of culture medium in ppm at 25°C, 30°C, 35°C, 40°C and 45°C, respectively, under the atmospheric pressure.

Table 1

| Cultivating temperature (°C) | $CO_2$ concentration in gas phase (% by volume) | $CO_2$ concentration of culture liquor (ppm) |
| --- | --- | --- |
| 25 | 30 | 447 |
| 30 | 30 | 380 |
| 35 | 30 | 349 |
| 40 | 30 | 312 |
| 45 | 30 | 282 |

In cultivating yeasts, it is necessary to prevent contamination by other strains, especially bacteria, but the growth of bacteria can be considerably reduced by adjusting the culture liquor to pH 2 to 5. Thus, it is possible to eliminate the contamination by bacteria. When there takes place contamination by bacteria, the substrate ethanol is consumed by the contaminating bacteria, and not only the yield of yeast cells is lowered, but also various problems are brought about in cultivation. The contamination is particularly unpreferable when the yeast cells are utilized as food or fodder. However, yeast cells can be obtained with a higher productivity in a higher yield without any contamination of bacteria by adjusting the culture medium to pH 2 to 5.

Temperature for cultivating yeasts according to the present invention is 25° to 48°C, and an optimum temperature is selected from said temperature range, depending upon the individual strains. In the case of the yeasts belonging to the genera Saccharomyces, Torulopsis, Pichia and Candida, almost equal productivity and yield can be obtained even at 37° to 48°C to those at less than 37°C, and thus the heat generated during the cultivation can be removed at a low cost by conducting the cultivation at 37° to 48°C, and also a risk of contamination by other yeasts or bacteria can be reduced thereby.

As described above, the contamination by other yeasts or bacteria can be completely eliminated by conducting the cultivation at pH 2 to 5 and a temperature of 37° to 48°C, and yeast cells for food and fodder can be obtained.

As a nitrogen source, such inorganic nitrogen compounds as ammonium salts, nitrates, etc. and such organic nitrogen compounds as urea, or organic nitrogen compounds-containing mixtures such as corn steep liquor, casein, yeast extract and meat extract can be used. In addition, such inorganic salts as potassium salts, magnesium salts, phosphates, manganese salts, zinc salts, iron salts and copper salts, and, if necessary, substances necessary for growth or growth-promoting substances such as vitamins, amino acids, etc. can be used.

The present process can be carried out by batch-wise or continuous cultivation. When an ammonium salt is used as a nitrogen source, the ammonium ions are consumed for growth of the cells, and consequently pH of culture medium is lowered. To keep the pH constant, it is necessary to add ammonia, potassium hydroxide or sodium hydroxide to the culture medium.

Yeast cells free from when contaminating microorganisms can be obtained with a higher productivity in a higher yield by conducting the cultivation in the manner as described above. After completion of the cultivation, yeast cells are separated by filtration or centrifugation, and, if necessary, washed, whereby wet cells can be obtained. The resulting wet cells are dried, and utilized as such or after further treatments as fodder. Substances contained in the cells, such as nucleic acids, vitamins, coengymes, proteins, lipids, etc. are extracted from the resulting cells as pure substances or in mixtures, and can be utilized in food, fodders, medicaments, and industrial raw materials.

EXAMPLE 1

Into four 1-l mini-jars each was placed 500 ml of a culture medium containing 4 g of $KH_2PO_4$, 3 g of $(NH_4)_2SO_4$, 0.4 g of $MgSO_4.7H_2O$, 0.2 mg of $FeSO_4.7H_2O$, 5 mg of $CaCl_2.2H_2O$, 0.5 mg of $MnSO_4.4H_2O$ and 1 ml of mixed vitamin liquid in 1 l of demineralized water and having pH 4.5. The media were sterilized at 120°C for 20 minutes, and then 4 g of ethanol was added to each of the media. Then, 2% by volume of *Pichia farinosa miso mogi* (IAM 4526) precultured at 37°C in a medium having the same composition as described above was inoculated into the media, and cultivated batch-wise under the atmospheric pressure at an aeration rate of 200 ml/min., pH 4.5, and cultivating temperatures of (1) 34°C, (2) 37°C, (3) 40°C and (4) 42°C by aeration-stirring. During the cultivation, the dissolved oxygen concentration of culture media was 3 to 8 ppm, and the carbon dioxide concentration in gas phase was 0.03 to 1.0% (the carbon dioxide concentration of culture liquor was 0.38 to 12.7 ppm). Cell yield on the basis of consumed ethanol and generation time at the respective temperatures are shown in Table 2.

Table 2

| Jar No. | Cultivation temperature | Cell yield | Generation time (hr.) |
| --- | --- | --- | --- |
| (1) | 34°C | 79.6% | 2.1 |
| (2) | 37°C | 71.2% | 1.7 |

Table 2-continued

| Jar No. | Cultivation temperature | Cell yield | Generation time (hr.) |
|---|---|---|---|
| (3) | 40°C | 72.3% | 2.3 |
| (4) | 42°C | 70.7% | 3.2 |

EXAMPLE 2

Into seven 1-l mini-jars each was placed 500 ml of a culture medium having the same composition as in Example 1, and then the culture media were sterilized at 120°C for 20 minutes. Then, 2% by weight of *Pichia farinosa miso mogi* (IAM 4526) precultured in the medium having the same composition as above and containing 0.8% by weight of ethanol at 30°C and pH 4.5 was inoculated into each of the media, and cultivated under the atmospheric pressure at an aeration rate of 200 ml/min., pH 4.5, and a cultivation temperature of 30°C by aeration-stirring, while controlling the ethanol concentration of the culture media to (1) 0.2% by weight, (2) 0.5% by weight, (3) 0.8% by weight, (4) 1.0% by weight, (5) 1.5% by weight, (6) 2.0% by weight, and (7) 4.0% by weight. During the cultivation, the dissolved oxygen concentration of the culture media was 3 to 8 ppm, and the carbon dioxide concentration in gas phase was 0.03 to 1.0% by volume (the dissolved carbon dioxide of the culture liquor was 0.38 – 12.7 ppm). The growth induction periods and cell concentrations of the culture liquor after the start of cultivation when cultivated at said ethanol concentrations are shown in Table 3.

Table 3

| Jar No. | Ethanol concentration in culture liquor | Growth induction period | Cell concentration | |
|---|---|---|---|---|
| (1) | 0.2% by weight | 4.0 | 3.0 | O.D 610 mμ |
| (2) | 0.5 by weight | 4.0 | 3.1 | " |
| (3) | 0.8 by weight | 4.0 | 2.9 | " |
| (4) | 1.0 by weight | 4.5 | 2.3 | " |
| (5) | 1.5 by weight | 5.0 | 2.1 | " |
| (6) | 2.0 by weight | 6.0 | 1.8 | " |
| (7) | 4.0 by weight | 11.0 | 0.5 | " |

EXAMPLE 3

Into a 3-l mini-jar was placed 1 l of the culture medium having the same composition as in Example 1, and the culture medium was sterilized at 120°C for 20 minutes. Then, 8 g of ethanol was added to the medium. Then, 2% by volume of *Torulopsis enokii* Y-113 (FERM P-1973; ATCC No. 20432) precultured in a medium having the same composition as above at 30°C and pH 4.5 was inoculated in the culture medium, and cultivated at 30°C and pH 4.5 batch-wise, and was further cultivated in a culture medium of the same composition as above at 30°C and pH 4.5 continuously, by changing the dissolved oxygen concentration of the culture liquor to 0.05, 0.1, 0.5, 1.0, 5.0, 10, 20, 30 and 35 ppm by changing a ratio of oxygen to nitrogen of their gas mixture, aeration rate, cultivation pressure, and number of stirring in unit time.

At 0.1 to 30 ppm, the cell yield was 80 to 85% for an average retention time of 4 hours, but at 0.05 ppm and 35 ppm the stationary state was not established for an average retention time of 4 hours, and the cell yields were 65 to 75% for an average retention time of 6 hours. In any of these cultivations, the ethanol concentration of the culture liquor was less than 0.1% by weight, and the carbon dioxide concentration in gas phase was 0.4 to 1.6% by volume (the carbon dioxide concentration of the culture liquor was 5 to 20 ppm). The pH was adjusted by adding ammonia water to the culture liquor.

EXAMPLE 4

Into three 1-l mini-jars each was placed 500 ml of a culture media having the same composition as in Example 1, and then the culture media were sterilized at 120°C for 20 minutes. Then, 4 g of ethanol was added to each of the culture media. Then, 2% by volume of *Hansenula alcolica* UM-88 (FERM P-2065; NRRL Y-8025) precultured in a medium having the same composition as above at 30°C and pH 4.5 was inoculated in each of the culture media, and cultivated batch-wise under the atmospheric pressure at a cultivating temperature of 30°C and pH 4.5, aeration rate of air or a gas mixture of carbon dioxide-air of 500 ml/min. and a carbon dioxide concentration in gas phase (carbon dioxide concentration of the culture liquor) of (1) 0.03 to 0.2% by volume (0.38 to 2.54 ppm) and (2) 1.0% by volume (12.7 ppm). In any of these cultivations, generation time was 2 hours, and cell yield on the basis of the consumed ethanol was about 82%. The pH was adjusted by adding ammonia water to the culture liquor.

EXAMPLE 5

In a 3-l mini-jar was placed 1 l of the culture medium having the same composition as in Example 1, and then the culture medium was sterilized at 120°C for 20 minutes. Then, 8 g of ethanol was added to the culture medium, and 2% by volume of *Hansenula alcolica* UM-88 (FERM P-2065; NRRL Y-8025) precultured in a medium having the same composition as above at 30°C and pH 4.5 was inoculated in the culture medium, and cultivated batchwise at 30°C and pH 4.5, and further cultivated in a culture medium of the same composition as above at 30°C and pH 4.5 under the atmospheric pressure continuously. The continuous cultivation was carried out by changing the carbon dioxide concentration in gas phase (carbon dioxide concentration of the culture medium) to 1% by volume (12.7 ppm), 3% by volume (38 ppm), 5% (63.5 ppm), 10% by volume (127 ppm), 20% by volume (254 ppm), 30% by volume (380 ppm), and 35% by volume (444.5 ppm) by changing a ratio of air to carbon dioxide in the gas mixture and an aeration rate. At the carbon dioxide concentration in gas phase of 1 to 30% by volume (the carbon dioxide concentration of the culture liquor of 12.7 to 380 ppm), the cell yield was 75 to 80% for an average retention time of 4 hours. At the carbon dioxide concentration in gas phase of 35% (the carbon dioxide concentration of the culture liquor 444.5 ppm), the stationary state was not established for an average retention time of 4 hours, and the cell yield was 60 to 70% for an average retention time of 6 hours. In any of the cultivations, the ethanol concentration of the culture liquor was less than 0.1% by weight. The dissolved oxygen concentration of the culture liquor was 2 to 4 ppm. The pH was adjusted by adding ammonia water to the culture liquor.

EXAMPLE 6

Into a 10-l jar was placed 5 l of a culture medium containing 4 g of $KH_2PO_4$, 3 g of $(NH_4)_2 SO_4$, 1.0 g of $MgSO_4 \cdot 7H_2O$, 1.0 mg of $FeSO_4 \cdot 7H_2O$, 80 mg of $CaCl_2 \cdot 2H_2O$, 2.0 mg of $MnSO_4 \cdot 4H_2O$, and 3 ml of mixed vitamin liquid and having pH 3.5, and after sterilization of the culture medium at 120°C for 20 minutes, 20 g of ethanol was added to the culture medium. Then, 2% by volume of *Candida alcomigas* Ya-23 (FERM P-1973; NRRL Y-8023) precultured at 30°C in a medium having the same composition as above and containing 0.8% by weight of ethanol was inoculated in the culture medium, and ethanol was continuously added to the culture liquor, corresponding to the amount of ethanol consumed, so that the ethanol concentration of the culture liquor might be maintained at 0.1 to 0.2% by weight. When the amount of ethanol added reached 300 g, the cultivation was switched to continuous one, and the medium containing 30 g/l of ethanol was added to the 10-l jar. Continuous cultivation was carried out at an ethanol concentration of the culture liquor of 0.01% by weight, dissolved oxygen concentration of the culture liquor of 2 ppm, carbon dioxide concentration in gas phase of 8% by volume (carbon dioxide concentration of the culture liquor 102 ppm), pH 3.5 and cultivating temperature of 30°C under the atmospheric pressure for an average retention time of 4 hours, whereby 6.1 g/l.hr of yeast cells were obtained. The pH was adjusted by adding ammonia water to the culture liquor.

EXAMPLE 7

Continuous cultivation was carried out under the same conditions as in Example 6, except that *Torulopsis methanothermo* U-22 (FERM P-2336; ATCC No. 20434) was used in place of *Candida alcomigas* Ya-23 (FERM P-1973; NRRL Y-8023), and cultivating temperature of 44°C, pH 4.5 and carbon dioxide concentration in gas phase of 10% by volume (carbon dioxide concentration of the culture medium 104 ppm) were employed, whereby 5.2 g/l.hr of yeast cells was obtained.

EXAMPLE 8

Continuous cultivation was carried out under the same conditions as in Example 6, except that *Hansenula alcolica* UM-88 (FERM P-2065; NRRL Y-8025) was used in place of *Candida alcomigas* Ya-23 (FERM P-1973; NRRL Y-8023), whereby 6.3 g/l.hr of yeast cells was obtained.

EXAMPLE 9

Continuous cultivation was carried out under the same conditions as in Example 6, except that *Saccharomyces steineri* (OUT 7911) was used in place of *Candida alcomigas* Ya-23 (FERM P-2065; NRRL Y-8025). whereby 6.0 g/l.hr of yeast cells was obtained.

EXAMPLE 10

Continuous cultivation was carried out under the same conditions as in Example 6, except that *Saccharomyces uvarumi* (OUT 7824) was used in place of *Candida alcomigas* Ya-23 (FERM P-2065; NRRL Y-8025, whereby 6.1 g/l.hr of yeast cells was obtained.

EXAMPLE 11

Continuous cultivation was carried out under the same conditions as in Example 6, except that *Saccharomyces carlsbergensis* (OUT 7929) was used in place of *Candida alcomigas* Ya-23 (FERM P-2065; NRRL Y-8025), whereby 5.8 g/l.hr of yeast cells was obtained.

EXAMPLE 12

Continuous cultivation was carried out under the same conditions as in Example 6, except that *Torulopsis methanophiles* T-106 (FERM P-1928; ATCC No. 20433) was used in place of *Candida alcomigas* Ya-23 (FERM P-2065; NRRL Y-8025), and an average retention time of 12 hours, an ethanol concentration of the culture medium of 0.01% by weight, a dissolved oxygen concentration of the culture medium of 3 ppm, a carbon dioxide concentration in gas phase of 3% by volume (carbon dioxide concentration of the culture medium 38 ppm) were employed, whereby 2.0 g/l.hr of yeast cells was obtained.

EXAMPLE 13

Continuous cultivation was carried out under the same condition as in example 6, exept that *Saccharomyces cerevisiae ellipsoideus* (IAM 4140) was used in place of *Candida alcomigas* Ya-23 (FERM P-2065, NRRL Y-8025) whereby 6.0 g/l.hr of yeast cells was obtained.

EXAMPLE 14

Continuous cultivation was carried out under the same condition as in example 6, except that *Saccharomyces cerevisiae* (bread yeast) (OUT 7871) was used in place of *Candida alcomigas* Ya-23 (FERM P-2065, NRRL Y-8025), whereby 5.9 g/l.hr of yeast cells was obtained.

EXAMPLE 15

Continuous cultivation was carried out under the same condition as in example 6, except that *Candida utilis* (OUT 6020) was used in place of *Candida alcomigas* Ya-23 (FERM P-2065, NRRL Y-8025), whereby 6.1 g/l.hr of yeast cells was obtained.

EXAMPLE 16

Continuous cultivation was carried out under the same condition as in Example 6, except that *Lipomyces sparkey* (OUT 6269) was used in place of *Candida alcomigas* Ya-23 (FERM P-2065, NRRL Y-8025), whereby 5.8 g/l.hr of yeast cells was obtained.

What is claimed is:

1. A process for cultivating ethanol-assimilating yeasts belong to species *Candida alcomigas, Torulopsis methanothermo, Torulosis enokii, Torulopsis methanophiles, Saccharomyces cerevisiae ellipsoideus* (IAM4140) *Hansenula alcolica, Saccharomyces steineri, Saccharomyces uvarum, Saccharomyces carlsbergensis* (OUT 7929), *Pichia farinosa miso mogi* (IAM 4526), *Candida utilis* (OUT 6020) or *Lipomyces sparkey*, using ethanol as a main carbon source, which comprises cultivating the yeasts in a culture liquor at an effective ethanol concentration of not more than 0.8 by weight based on the total weight of the culture liquor, a dissolved oxygen concentration of 0.1 to 30 ppm, a dissolved carbon dioxide concentration of 0.38 to 380 ppm, pH of 2.0 to 5.0 and temperature of 25° to 48°C.

2. Process of claim 1, wherein at least 0.01% by weight ethanol is used.

3. A process according to claim 1, wherein the cultivation is carried out batch-wise.

4. A process according to claim 1, wherein the cultivation is carried out continuously.

5. A process for cultivating ethanol-assimilating yeasts belonging to strain *Candida alcomigas* Ya-23 (FERM P-1973; NRRL Y-8023), *Torulopsis methanothermo* U-22 (FERM P-2336; ATCC No. 20434), *Torulopsis enokii* Y-113 (FERM P-2064; ATCC No. 20432), *Torulopsis methanophiles* T-106 (FERM P-1928; ATCC No. 20433), *Saccharomyces cerevisiae ellipsoideus* (IAM4140), *Hansenula alcolica* UM-88 (FERM P-2065; NRRL Y-8025), *Saccharomyces steineri* (OUT 7911), *Saccharomyces uvarum* (OUT 7828), *Saccharomyces carlsbergensis* (OUT 7929), *Pichia farinosa miso mogi* (IAM 4526), *Candida utilis* (OUT 6020) or *Lipomyces sparkey* (OUT 6269), using ethanol as a main carbon source, which comprises cultivating the yeasts in a culture liquor at an effective ethanol concentration of not more than 0.8 by weight based on the total weight of the culture liquor, a dissolved oxygen concentration of 0.1 to 30 ppm, a dissolved carbon dioxide concentration of 0.38 to 380 ppm, pH of 2.0 to 5.0 and temperature of 25° to 48°C.

6. A process for cultivating ethanol-assimilating yeasts belonging to species *Candida alcomigas, Torulopsis methanothermo, Torulosis enokii, Torulopsis methanophiles, Hansenula alcolica, Saccharomyces steineri, Saccharomyces uvarum, Saccharomyces carlsbergensis* (OUT 7929), *Candida utilis* (OUT 6020) or *Lipomyces sparkey,* using ethanol as a main carbon source, which comprises cultivating the yeasts in a culture liquor at an effective ethanol concentration of not more than 0.8 by weight based on the total weight of the culture liquor, a dissolved oxygen concentration of 0.1 to 30 ppm, a dissolved carbon dioxide concentration of 0.38 to 380 ppm, pH of 2.0 to 5.0 and temperature of 25° to 48°C.

* * * * *